United States Patent [19]

Langeraar et al.

[11] Patent Number: 4,549,286

[45] Date of Patent: Oct. 22, 1985

[54] INTERFERENCE SUPPRESSION UNIT FOR A SONAR APPARATUS

[75] Inventors: Huibert B. Langeraar; Alexander P. M. Van Der Schoot, both of Hengelo, Netherlands

[73] Assignee: Hollandse Signaalapparaten B.V., Hengelo, Netherlands

[21] Appl. No.: 468,722

[22] Filed: Feb. 22, 1983

[30] Foreign Application Priority Data

Feb. 24, 1982 [NL] Netherlands ............... 8200728

[51] Int. Cl.$^4$ .................. G01S 7/66; G01S 15/06
[52] U.S. Cl. ............................ 367/97; 367/103
[58] Field of Search .................... 367/97, 98, 103, 901

[56] References Cited

U.S. PATENT DOCUMENTS 2,978,577 4/1961 Ketchledge ................... 367/97
3,609,672 9/1971 Bossert ........................ 367/97

Primary Examiner—Richard A. Farley
Attorney, Agent, or Firm—Robert T. Mayer; Bernard Franzblau

[57] ABSTRACT

Sonar apparatus provided with a beamforming network (1) containing several receiving channels (4A–M) for supplying, for each direction of beam incidence, digital composite signal products obtained by superposition of the receiving channel output signals and for transforming the signal products to a low-frequency band. The signal products are fed to a signal analysing circuit (3) comprising blocking circuits (62 and 63), and to a noise detector (61) for deriving, for each direction of beam incidence, a blocking circuit control voltage from the interference signal components in the signal products. The noise detector selects signals outside the low-frequency band part representing the transmitting/receiving band, and determines the modulus of the filtered signals and the average value thereof. The modulus and, after thresholding, the average value are fed to a comparator (77) to generate the control voltage.

7 Claims, 8 Drawing Figures

INTERFERENCE SUPPRESSION UNIT FOR A SONAR APPARATUS

The invention relates to a sonar apparatus, comprising a beamforming network and a signal analysing circuit, where the beamforming network contains a plurality of receiving channels with synchronously active sound detection elements and band filter means for supplying, for each direction of beam incidence, digital composite signal products relative to the sound energy from the sound detection elements. These signal products are obtained by superposition of the receiving channel output signals. The network further contains frequency transformation means for transforming the composite products to a low-frequency band.

Such a sonar apparatus is known from the articles by R. G. Pridham and R. A. Mucci: "Digital Interpolation Beamforming for Low-Pass and Bandpass Signals"; Proc. of the IEEE, Vol. 67, No. 6, June 1979, pp. 904–919, and "A Novel Approach to Digital Beamforming", Journal of Acoustical Society of America, 63(2), February 1978, pp. 425–434.

The sonar apparatus described in these articles has, however, the disadvantage that the composite products contain signal components of valid echo signals, as well as those of pulsed interference signals, so that the processing of these products gives rise to faulty results in the calculation of the frequency, direction, range and amplitude with respect to the detected target, and hence to an incorrect determination of the target location.

The present invention has for an object to obviate this disadvantage.

The invention is based on the fact that pulsed interference signals manifest themselves over the entire frequency band, so that information exclusively about these signals can be obtained out of that part of the sonar-assigned frequency band in which no valid echo signal can be expected at that instant, which part therefore is not used for the generation of the last transmitter pulses.

Accordingly, the sonar apparatus is provided with a blocking circuit responsive to the signal analysing circuit, and a noise detector, fed with the composite products, for deriving for each direction of beam incidence a blocking circuit control voltage from the information about interference signals as contained in the composite products. The noise detector comprises: a continuous network of a digital band filter for selecting signals outside the low frequency band part representing the transmitting/receiving band; a processor for determining the modulus of the filtered signals; a smoothing filter for determining the average value of the measured amplitude samples supplied in a certain time interval; a threshold circuit fed with the average value of the smoothing filter; and a comparator, connected to the threshold circuit and the processor, for generating said control voltage.

The invention will now be described with reference to the accompanying figures, in which.

Figure 1:
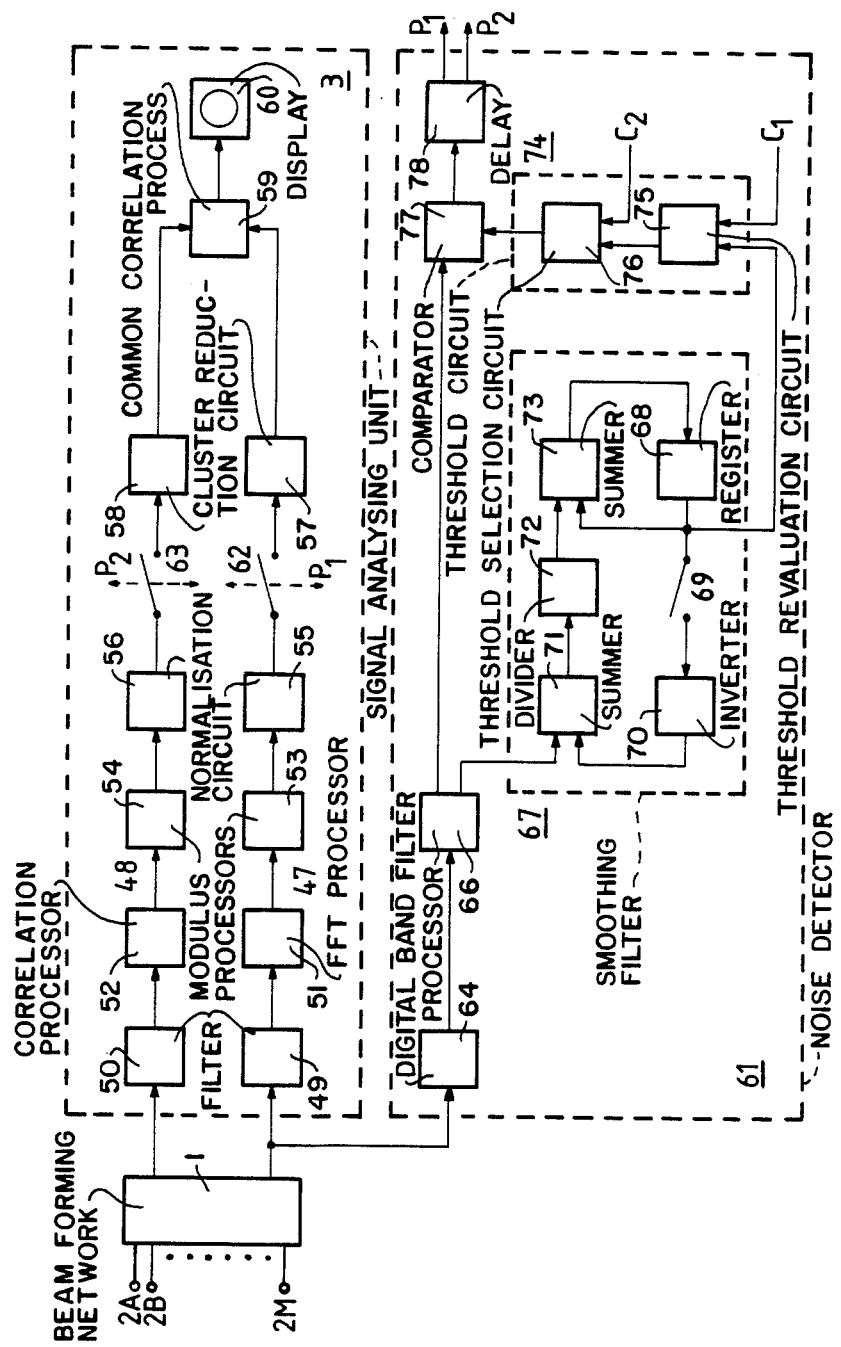
FIG. 1 shows a block diagram of a feasible embodiment of a sonar apparatus provided with a noise detector with blocking circuits according to the invention.
Figure 2:
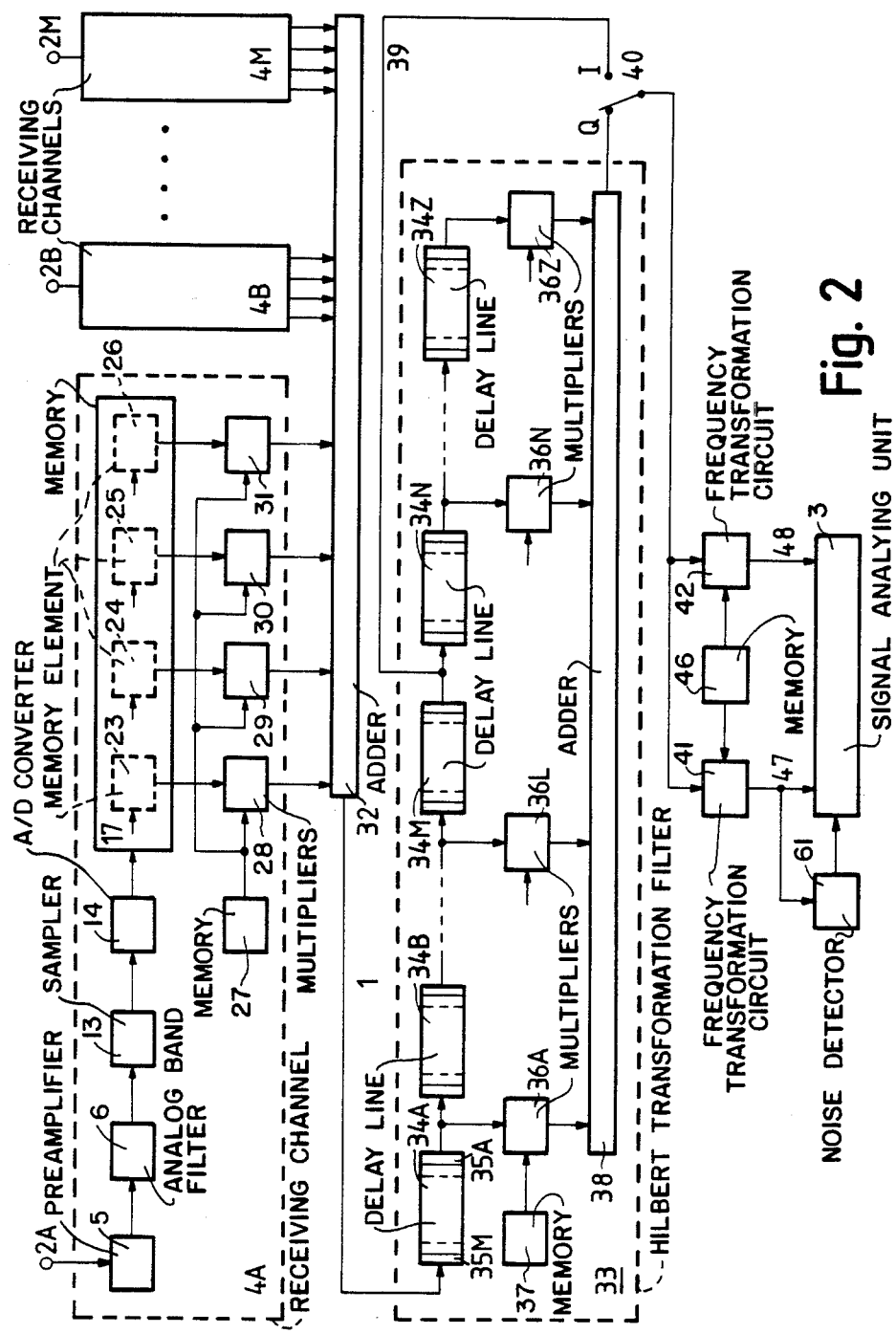
FIG. 2 shows a block diagram of a feasible embodiment of a digital beamforming network for the sonar apparatus of FIG. 1.

In FIG. 1 the block diagram of a sonar apparatus comprises a beamforming network 1 including a plurality (M) of sound detection elements 2A–M and a signal analysing unit 3 connected thereto. Although several embodiments of such a digital beamforming network are applicable and known from the cited articles, the ensuing description on beamforming networks is confined to the network depicted in FIG. 2. The beamforming network 1 of FIG. 2 comprises a number of receiving channels 4A–M connected to respective detection elements 2A–M. Since the receiving channels 4A–M are of identical design, the description of the design and the functioning of these channels will be confined to receiving channel 4A.

In the embodiment in question, the detection element 2A is representative of an array of vertically disposed, equally directed hydrophones, via which the transmitter energy is delivered to the water and via which the detected signals, after combining these signals, enter the associated receiving channel 4A. In this embodiment it is assumed that the detection elements 2A–M are disposed in a cylindrical array. It should be noted that different embodiments and arrangements of the detection elements are applicable.

Figure 3A:
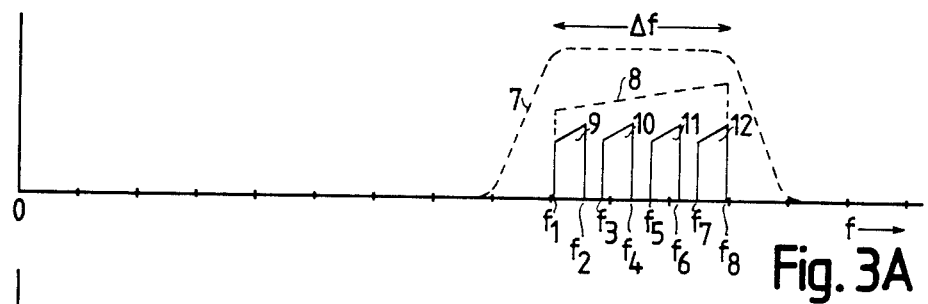
FIGS. 3A–F are characteristic relative to the signal transmission incurred with the sonar apparatus of FIGS. 1 and 2.

The signal obtained via detection element 2A passes through a preamplifier 5 for application to an analogue band filter 6, whose response bandwidth 7 (see FIG. 3A) is slightly greater than the sonar transmitter frequency range $\Delta f$, denoted by 8. The transmitter frequency range 8 may represent in its entirety the band of the CW or FM pulsed signals to be generated, or it may comprise one set of two separate frequency bands for the two types of pulsed signals. It is also possible that the transmitter frequency range 8 comprises two sets of such frequency bands, as applicable in the embodiment in question. Such a transmitter frequency range 8 (see FIG. 3A) limited by frequencies $f_1$ and $f_8$ may be divided into the following four separate frequency ranges: a CW band 9 with limit frequencies $f_1$ and $f_2$; an FM band 10 with limit frequencies $f_3$ and $f_4$; an FM band 11 with limit frequencies $f_5$ and $f_6$; and a CW band 12 with limit frequencies $f_7$ and $f_8$. The CW band 9 and the FM band 11 then form one set of frequency bands, while the FM band 10 and the CW band 12 belong to the second set of frequency bands. In this way, two sonar-equipped vessels at close range of each other are able to operate separately in their own set of FM and CW bands without interfering with each other. The bandfilter 6 is especially of importance in preventing the passage of signals in the part of the spectrum which, due to a subsequent sampling process of the detected signals, will also contain frequency components of the signals. On account of this function, the filter 6 is usually called an "anti-aliasing" filter. Moreover, because of the bandwidth reduction in the receiving channel, filter 6 achieves an improvement of the signal-to-noise ratio of the system.

Figure 3B:
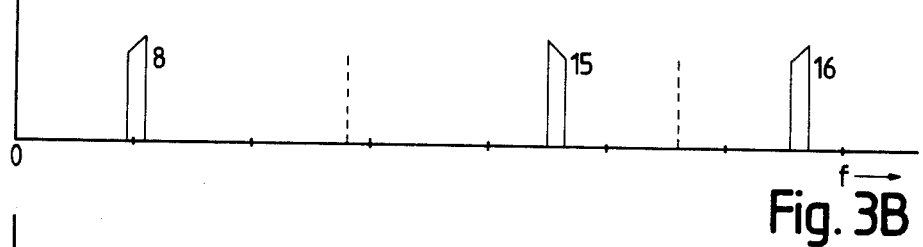

The signals passed by bandfilter 6 are sampled in circuit 13, and the signal samples are digitised in an analogue-digital converter 14. Circuit 13 and A/D converter 14 are under the control of a timing circuit (not shown) delivering switching signals of a frequency $f_s$. In the embodiment in question, frequency $f_s$ is several times greater than the transmitter frequencies utilised, to amply meet Nyquist's theorem in the signal processing. Because of the sampling process and the analogueto-digital conversion of the signals at a frequency $f_s$, the data contained in band $(f_1, f_8)$ will be fully recovered in each of the frequency bands $(kf_s - f_8, kf_s - f_1)$ and $(kf_s + f_1, kf_s + f_8)$, where k is an integer. In addition to the original band 8, FIG. 3B also depicts the new frequency bands 15 and 16 for k=1.

The signal samples obtained from A/D converter 14 at a rate $f_s$ are stored in a memory 17 for the duration of several sampling periods.

The signal samples obtained simultaneously from the receiving channels 4A-M should yield directional information of the detected target, although no such information is recognisable. The solution to this problem is therefore based on the assumption of a number of directions of incidence for the plane wavefront, the socalled directions of beam incidence. Through superposition of the signal samples available, taking into account the necessary phase correction for each of these directions, a composite product is created. With the application of a signal processing procedure at a later stage, whole composite products make it possible to determine the post probable value for the direction of the target. It should be noted that the denotation composite product concerns the summation process to be performed, but not a multiplication process. As concerns the number of directions of beam incidence to be assumed and hence the number of composite products to be obtained, the number selected in the embodiment in question corresponds with the number of applied detection elements 2A-M.

Since the diameter of the cylindrically disposed array of elements 2A-M is significantly greater than the propagation distance propagated by the sound wave in water in an interval limited by two successive sampling times, it is not possible to utilise simultaneously sampled signals for the formation of a composite product relative to the same phase line, even if phase corrections were to be made on these signals. On the contrary, it is necessary to use signal samples which are taken at different times and which cannot be used to form a composite product until the execution of a phase correction. For a different direction of beam incidence there is a different phase relationship between the signal samples used to form the composite product, so that with the selection of signal samples due allowance must be made for the appropriate sampling time and the appropriate phase correction. The phase correction is obtained by multiplying the selected signal sample by a phase correction factor, which is stored in the memory for each direction of beam incidence. In this way it is possible to obtain, for each random direction of beam incidence, a composite product from the signal samples of receiver channels 4A-M, which signal samples are phase modified by the particular correction factors.

With the formation of each composite product, it is permitted to utilise signal samples of a reduced number of receiving channels. The number of receiving channels selected for providing the signal samples to form a composite product for one given direction of beam incidence lies between one-third and half of the total number of receiving channels. The use of the signal samples from a selected number of receiving channels is justifiable as this effects, on the one hand, a considerable saving in calculations and a limitation of memory capacity with respect to the phase correction factors and, on the other hand, no appreciable deviation in the composite product. The receiving channels involved in forming the composite product are selected on the disposition of the associated detection element, which should be as close as possible to the assumed point of incidence of the sound wave for the group of detection elements 2A-M. For each other supposed direction of beam incidence, different receiving channels are thus selected.

Figure 3C:
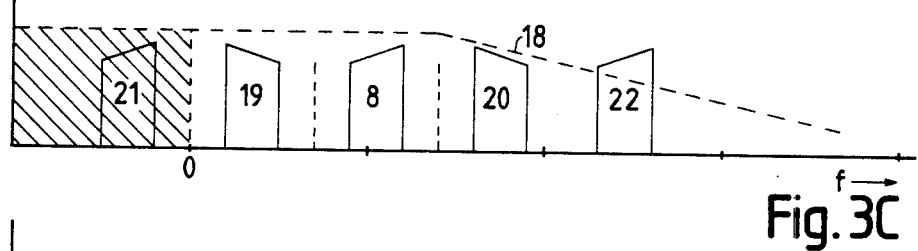

Before combination of the modified signal samples to form a composite product at this stage of the signal processing, it is preferable to make another correction to the signal samples. This correction should be of such a nature that the composite product then obtained represents a "weighted" signal beam. This correction is made by multiplying the signal samples or the phase corrected by "weighting factors". It is obvious to combine these two multiplication processes (with respect to the phase correction and weighting factors) so that for each direction of beam incidence, each of the signal samples is modified by a combined correction factor only once. The digital correction of the signal samples has the advantage that with a change in the propagation velocity of sound in seawater the correction factors can be easily adapted. A separate memory part could contain, for example, temperature-dependent correction factors to be assigned after a sound velocity measurement. The correction measures performed on the signal samples of a selected number of receiver channels can be construed as a digital filter process having the filter characteristic 18 in FIG. 3C.

Since, as a rule, the sampling frequency $f_s$ and the transmitter frequencies are widely separated, it is permitted to apply decimation of the output sampling frequency. As a result, the frequency band 8 is folded over to lower frequency values. In case the decimation is a factor four, new frequency bands are obtained for band 8, namely $(\frac{1}{4}kf_s - f_8, \frac{1}{4}kf_s - f_1)$ and $(\frac{1}{4}kf_s + f_1, \frac{1}{4}kf_s + f_8)$, where k is an integer. Each of these bands again contains the complete signal information of the original band 8. In addition to band 8, FIG. 3C also shows the bands 19 and 20 belonging to the first set of frequency bands for k=1 and k=2, and the bands 21 and 22 belonging to the second set of frequency bands for the values k=1 and k=2. The suggested decimation of the output sampling frequency by a factor of four is achieved by composing the composite products in sets of four for each direction of incidence and delivering the thus obtained result once every four sampling periods.

Instead of the superposition or formation of four composite products obtained in succession, the signal samples required to form the four composite products for one and the same direction of beam incidence may first be modified in each receiving channel by combined correction factors and then be superposed to obtain sum values. Thereafter, these values are superposed once again. Execution of this processing phase is achieved by selecting in memory 17, for each receiving channel and for each direction of incidence, the four memory elements (23-26) containing the values required for the calculation of the four composite products. Each signal sample selected in one of the memory elements 23-26 is then multiplied by a combined correction factor from memory 27. This multiplication process is performed in elements 28, 29, 30 and 31, respectively. Superposition of the four values thus corrected is achieved for each receiving channel in an adder circuit 32. The value thus obtained and that of other receiving channels are accumulated in circuit 32.

The output of adder circuit 32 is passed to a Hilbert transformation filter 33 of the digital type. Filter 33 uses the frequency components contained in its input signal to generate a signal consisting of frequency components, each of which has been subject to a 90° phase shift with respect to the frequency components of the input signal. A theoretical consideration of the Hilbert transformation process applied is given in D. A. Linden's article: "A Discussion of Sampling Theorems" in Proc. of the IRE, July 1959, pp. 1219-1226, as well as in the aforementioned articles. Along with each real composite product (I), an imaginary composite product (Q) is obtained from the Hilbert transformation filter 33. Each input value therefore results in two output values (I and Q), which implies a doubling of the number of samples. According to Nyquist's theorem, it is permitted to halve the output sampling rate without losing any information; that is, each two composite products applied to filter 33 may yield one real composite product (I) and one imaginary composite product (Q) as output values of the filter. Halving of the sampling frequency is of special importance to the subsequent signal processing in the signal analysing circuit 3, which can therefore be considerably reduced in size. The Hilbert transformation filter 33 consists of an FIR filter of the non-recursive type having an antisymmetric impulse response with an odd number of delay lines 34A–Z and filter coefficients in the delay lines, as described by L. R. Rabiner and B. Gold in "Theory and Application of Digital Signal Processing", Prentice Hall, Inc., Englewood Cliffs, N.J., Ch. 2.19, 2.20, 2.27, 3.4 and 3.5. Each of these delay lines has a number of memory locations 35A–M, corresponding with the number (M) of directions of incidence, for receiving and subsequently passing the composite products delivered by adder circuit 32 for each direction of incidence. In this type of filter the weighting factors are alternately zero, requiring only alternate delay lines of the filter to be connected to a tap with circuit 36$i$, where $i = A, \ldots, Z$, for the multiplication of the supplied signal sample by the associated weighting factor from memory 37. The values obtained from circuits 36A–Z are accumulated in an adder circuit 38 to achieve the desired composite product of quadrature frequency components. This imaginary composite product (Q) and the associated real composite product (I), obtained via a tap 39 from the centre of the series of delay lines 34A–Z, are passed alternately by a switch 40 for application to two frequency transformation circuits 41 and 42.

Figure 3D:
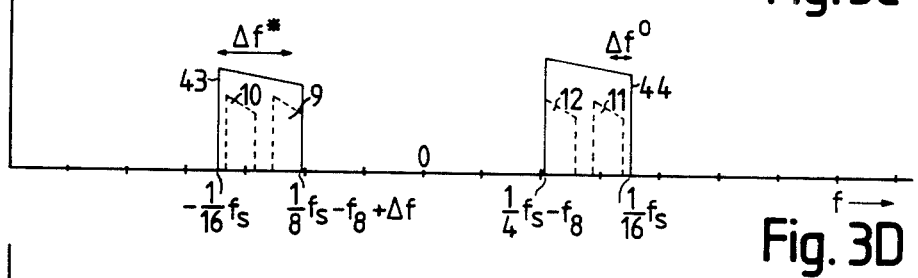
Figure 3E:
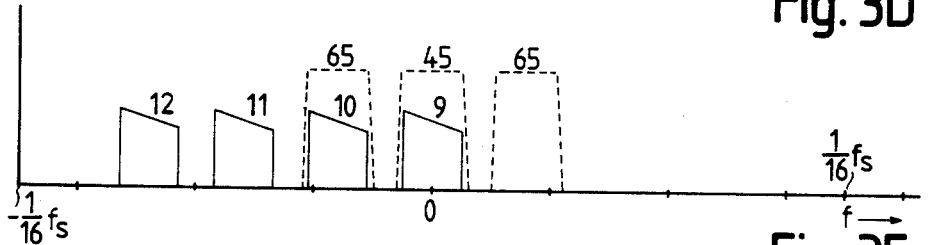

The frequency transformation circuits 41 and 42 are designed to process, respectively, on a CW and FM basis, the I and Q composite products, supplied in pairs. The contemplated reduction of the output sampling frequency by a factor of two is obtained by making the switching frequency of switch 40 equal to the frequency at which the composite products are supplied to filter 33. Since the supplied imaginary composite products, together with the real composite parts already available, determine the rotation direction of the signal vector, the spectrum of the Hilbert transformation filter 33 represents nothing but "positive frequencies", as the "negative frequencies" are eliminated. The two successive reductions of the sampling frequency by factors of four and two yield for each type of composite sample an output sampling frequency of $\frac{1}{8}f_s$ for filter 33. The result will be that the part of the frequency band 19 past the value of $1/16f_s$ is folded over into the negative spectral part. Two separate frequency bands are now of importance, viz. band 43 determined by $(-1/16f_s, \frac{1}{8}f_s - f_8 + \Delta f)$, where $\Delta f$ is the width of the transmission band 8 and band 44 determined by $(\frac{1}{8}f_s - f_8, 1/16f_s)$, as depicted in FIG. 3D. With a symmetric distribution of the transmission band 8 over the two bands 43 and 44, the negative band 43 contains in succession the transmission bands 10 and 9, and the positive band 44 the transmission bands 12 and 11. For practical processing of the signal information in the signal analysing circuit 3, the available information in the frequency transformation circuits 41 and 42 is transformed to a frequency band 45 about 0 Hz (see FIG. 3E), where the magnitude of the frequency swing is dependent upon the band in which the transmitter pulse is generated. Thus, in case an echo is received on a CW pulse from transmission band 9 (of the first set of frequency bands), the two composite products (I and Q) will be transformed with a frequency swing of $1/16f_s - \Delta f^*$ to the frequency range about 0 Hz, where $\Delta f^*$ is equal to the frequency difference between $-1/16f_s$ and the centre frequency of band 9 (see FIG. 3D). The remaining bands 10–12 are automatically transformed as well, but they remain well within the permissible band $(-1/16f_s, 1/16f_s)$. The magnitude of the frequency swing applied with this transformation is known because of the selected transmitter frequency. If subsequently an FM pulse from transmission band 11 (also from the first set of frequency bands) is generated, transformation occurs with a frequency swing of $\Delta f^\circ - 1/16f_s$, where $\Delta f^\circ$ is equal to the frequency difference between $1/16f_s$ and the centre frequency of band 11. Consequently, band 11 will assume a frequency range (45) about 0 Hz, while the sequence of the respective transmission bands 9 and 12 will again be maintained.

In the frequency transformation circuits 41 and 42 use is made of the possibility to include in the frequency transformation a frequency compensation for the doppler shift in the signal samples as a result of the ship's own speed. This should however be applied in each direction of beam incidence. For the ultimate frequency transformation in circuits 41 and 42 there are two signal components available, a real component (R) and an imaginary component (S) which, depending on the direction of beam incidence, the selected transmission band and the measured ship's speed, are periodically calculated by a computer (not shown) and stored in a memory 46. With each pair of I and Q signal components, passed in succession via switch 40, the frequency transformation circuits 41 and 42 (for the CW and FM phases, respectively) supply the signal analysing circuit 3 with the T and W components in succession, simultaneously with the R and S components from memory 46, on the basis of the multiplication $(I+jQ) \cdot (R+jS) = (IR - QS) + j(QR + IS) = T + jW$ (see FIG. 1). The signal analysing circuit 3 therefore comprises two channels 47 and 48 for independent processing of digital values based on the CW and FM pulses, respectively. In a feasible embodiment of the signal analysing circuit 3 each of the channels 47 and 48 is provided with a digital low-pass filter 49 and 50, where the bandwidth of the total band 45 centred about 0 Hz (see FIG. 3E) is somewhat greater than the width of each of the transmission bands 9, 10, 11 and 12. Filters 49 and 50 consist of an FIR filter of the non-recursive type having a symmetrical impulse response with an even number of delay lines. With an input sampling rate of $\frac{1}{8}f_s$, the output sampling rate will be so chosen that all significant frequency components are contained in band 45. In practice this implies a reduction of the sampling rate by a certain factor which depends on the filter bandwidth.

The number of delay lines in the filters is such that the samples are used several times, while the multiplication of the samples by real filter coefficients occurs in a manner as described for the Hilbert transformation filter 33. The real and imaginary components T and W to be supplied are separated; that is they are processed alternately in the particular channel 47 or 48, depending on the transmission mode used (CW or FM).

The filter response values obtained in the CW channel 47 are subjected to a signal process with the application of Fast Fourier Transform (FFT) in unit 51, and the filter response values obtained in the FM channel 48 to a correlation process in unit 52. The real and imaginary values T* and W* obtained in units 51 and 52 are supplied to modulus processors 53 and 54, respectively, to determine the log $\sqrt{(T^*)^2 + (W^*)^2}$ value.

An $\alpha$-$\beta$ filter in two normalisation circuits 55 and 56 determines a trend value from the values produced by processors 53 and 54 respectively; in the CW channel 47 this also occurs for each frequency channel. By subsequently reducing the supplied signal by the trend value, only the interferences of short duration and hence the echo signals from a target remain. Thus, for each direction of beam incidence, signal samples and noise become available for application to two cluster reduction circuits 57 and 58. In each of the circuits 57 and 58, the maximum signal-to-noise ratio is determined each time over a limited number of supplied samples to establish the maximum signal sample at the maximum signal-to-noise ratio. At the same time the adjacent beams are checked for the presence of a maximum signal sample at about the same range and frequency. From the maximum signal samples obtained the absolute maximum is determined. Using a number (e.g. five) of signal samples at the absolute maximum, the direction is determined accurately, while a weighted average value of the associated range, frequency and amplitude is established. The values pertaining to the absolute maximum and representing the direction, range, frequency and amplitude are called parameters of the reduced cluster. In each time interval of some seconds a considerable number (approx. 100) of these reduced clusters are however established. These clusters then undergo a common correlation process in unit 59 to yield an association between different reduced clusters. This results in a reduction of the number of false alarms on a PPI display 60 and an increase in the detection sensitivity.

The object of the invention is to prevent, as much as possible, the impulse noise picked up by the detection elements 2A-M from adversely affecting the process in cluster reduction circuits 57 and 58. The measures taken in this respect consist of the incorporation of a noise detector 61 and two blocking circuits 62 and 63, controlled by detector 61. Circuit 62 is inserted in the connection between normalisation circuit 55 and cluster reduction circuit 57 and circuit 63 in the connection between normalisation circuit 56 and cluster reduction circuit 58.

The impulse noise is noticeable over the entire frequency band, both inside and outside the band part of the transmission frequencies. On the basis of such a behavioral pattern of the impulse noise, the noise detector 61 comprises a digital band filter 64 which, in the embodiment in question, is fed with the CW output values of the beamforming network 1, whereby the position of the pass band 65 (see FIG. 3E) in the positive and hence in the negative spectrum part is so chosen that the frequency difference between the centre frequencies of filters 49 and 50 on the one side and filter 64 on the other side is equal to the difference between the centre frequencies of two successive transmission bands depicted in FIG. 3A. Consequently, transformation of frequencies from a transmission band, for instance band 9, to the pass band 45 of filter 49 or 50 (see FIG. 3E) will always bring one of the remaining, non-used transmission bands, in this case band 10, within the (positive or) negative pass band 65 of band filter 64, thus passing noise signals outside the active transmission band 9.

Figure 3F:
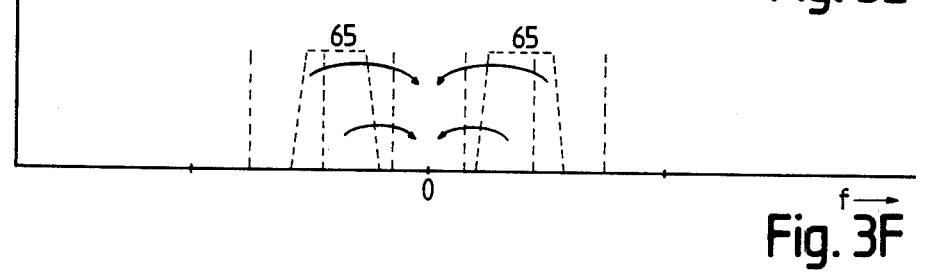

Band filter 64 operates in a manner as described for filters 49 and 50, albeit that the filter coefficients are of a different value, whereby the characteristic of the pass band 65 (see FIG. 3E) is shifted with respect to a lowpass band 45 of filters 49 and 50, so that only noise signals are passed. The output sampling rate, which is equal to that of filters 49 and 50, cause the frequency components passed through filter 64, i.e. those of the noise signals, to be overlapped into a band centred about 0 Hz (see FIG. 3F).

Processor 66 calculates the logarithm of the modulus of the real and imaginary components T* and W* supplied in pairs via band filter 64. This value is fed to a smoothing filter 67 to determine the signal trend of a number of logarithmis moduli in a certain time interval. The smoothing filter 67 thus comprises a register 68, an inverting circuit 70 connected to register 68 via a switch 69, a first summing circuit 71 connected to inverting circuit 70 and processor 66, and a second summing circuit 73 connected to register 68 and, via a divider 72, to the first summing circuit 71. In order to shorten the settling phase of smoothing filter 67, switch 69 is kept in the open position for a short duration after activation of the sonar apparatus. The first summing circuit 71 then passes the supplied digital values ($y_i$) unchanged to a divider 72, which delivers a fraction 1/N (where N is a predefined number) of the supplied value to the second summing circuit 73, which also receives the value stored in register 68.

After determination of the sum value $$A_n = \frac{\sum\limits^{N} y_i}{N}$$

of the first N digital values in the second summing circuit 73, and after storage of this sum value in register 68, switch 69 is closed, so that with the use of the inverting circuit 70 the first summing circuit 71 generates the sum value $A_i = y_i - A_{i-1}$, where $A_{i-1}$ for $i > N$ is the actual content of register 68 at the moment of supplying the $y_i$ value to smoothing filter 67. From the two supplied values the second summing circuit 73 then determines the result:

$$A_i = \frac{y_i - A_{i-1}}{N} + A_{i-1} = \frac{y_i + (N-1)A_{i-1}}{N}$$

This result is written in register 68 and subsequently applied to a threshold circuit 74. The time when switch 69 is in the open position corresponds with the time when N digital values are supplied in succession to the divider 72.

Threshold circuit 74 comprises a threshold revaluation circuit 75, which increases the available value by an adjustable constant $C_1$ in order to avail of a sufficiently high threshold for revaluating the presence of noise signals. The revaluated threshold value is applied to a comparator 77 via a threshold selection circuit 76 in threshold circuit 74, but not during the settling time of the smoothing filter 67 (when switch 69 is still in the open position). In this case the threshold selection circuit 76 supplies the comparator 77 with a replacement threshold $C_2$. In case a value from the modulus processor exceeds the supplied threshold value, comparator 77 delivers a switching signal to a delay circuit 78. Circuit 78 produces the contemplated control pulses ($P_1$ and $P_2$) of certain duration with certain delays for application to the blocking circuits 62 and 63 to block the passage of the digital values from normalisation circuits 55 and 56 to the cluster reduction circuits 57 and 58. The delay of control pulse $P_1$ from the CW channel 47 to blocking circuit 62 usually deviates from that ($P_2$) for the FM channel 48, since the processing time in processors 53 and 54 is different. It will be clear that the suppression of noise pulses should occur for each direction of incidence and for each range value. The entire process taking place in noise detector 61 should be executed exclusively on account of digital signal samples correlated in range and direction of incidence. This implies that register 68 must be provided with a memory capacity which is determined by the number of directions of incidence.

We claim:

1. Sonar apparatus comprising a beamforming network and a signal analysing circuit, where the beamforming network comprises a plurality of receiving channels with synchronously active sound detection elements and band filter means for supplying, for each direction of beam incidence, digital composite signal products relative to the sound energy from the sound detection elements, said signal products being obtained by superposition of the receiving channel output signals, the beamforming network further comprising frequency transformation means for transforming the composite signal products to a low-frequency band, characterized in that the sonar apparatus comprises blocking circuits responsive to the signal analysing circuit, and a noise detector supplied with the composite signal products for deriving, for each direction of beam incidence, a blocking circuit control voltage from the information about interference signals as contained in the composite signal products, wherein the noise detector comprises: a continuous network of a digital band filter for selecting signals outside the low-frequency band part representing the transmitting/receiving band; a processor for determining the modulus of the filtered signals; a smoothing filter for determining the average value of the measured amplitude samples supplied in a certain time interval; a threshold circuit supplied with the average value of the smoothing filter; and a comparator connected to the threshold circuit and to the processor for generating said control voltage.

2. Sonar apparatus as claimed in claim 1, characterised in that the noise detector comprises means connected to the smoothing filter for incrementing said average value by a constant to obtain a reference value for the comparator.

3. Sonar apparatus as claimed in claim 2, characterised in that the noise detector is designed to supply a predefined value in substitution of said reference value during a predefined period after the generation of a transmitter pulse.

4. Sonar apparatus as claimed in claim 1, further comprising delay means coupled between the smoothing filter and the blocking circuit.

5. Sonar apparatus as claimed in claim 1, characterised in that the smoothing filter is designed to calculate, for each direction of beam incidence, a reference value ($A_i$) in accordance with the formula:

$$A_i = \frac{y_i + (N-1)A_{i-1}}{N}$$

where $i = 1, 2, \ldots$, and $y_i$ is the modulus of the processorsupplied composite signal product bearing upon the particular direction of beam incidence and having index number i at a predefined number N.

6. Sonar apparatus as claimed in claim 1, characterised in that the smoothing filter is designed to calculate, for each direction of beam incidence, said reference value ($A_i$) in accordance with the formula:

$$A_i = \frac{y_i + (N-a)A_{i-1}}{N}$$

where $i = 1, 2, 3, \ldots$, $A_o = 0$, $y_i$ is the modulus of the processorsupplied composite signal product bearing upon the particular direction of beam incidence and having index number i at a predefined number N, and where $a = 0$ when $i \leq N$, and $a = 1$ when $i > N$.

7. Sonar apparatus as claimed in claim 1 wherein the threshold circuit includes means connected to the smoothing filter output for incrementing said average value by a constant value thereby to supply a reference value to the comparator.

* * * * *